United States Patent Office 3,393,632
Patented July 23, 1968

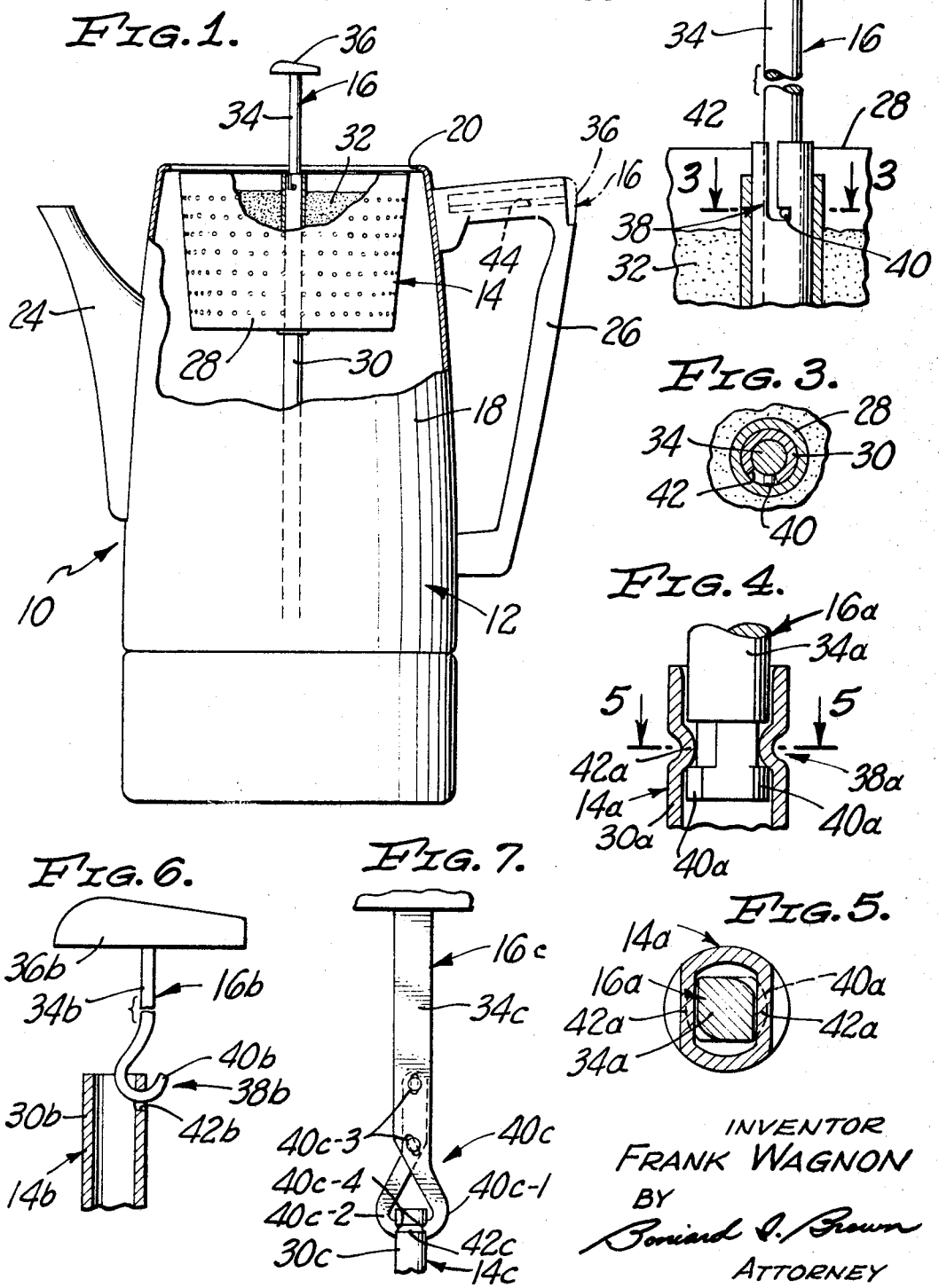

3,393,632
EXTRACTOR FOR COFFEE POT
PERCOLATING UNIT
Frank Wagnon, 420 E. Merced Ave.,
West Covina, Calif. 91790
Filed Jan. 30, 1967, Ser. No. 612,565
5 Claims. (Cl. 99—289)

ABSTRACT OF THE DISCLOSURE

A percolator stem is modified at its upper end to receive a tool having a handle and a shank with gripping means thereon to cooperate with the percolator stem to remove it after the coffee is brewed. The coffee pot has a handle with a recess therein to receive the tool when not in use.

This invention relates generally to improvements in coffee percolators; more particularly, the present invention relates to a coffee percolator combination including an extractor for removing from the coffee pot of the percolator the percolating unit which contains the coffee grounds.

A typical coffee percolator includes a pot containing a removable percolating unit having a perforate filter basket for containing ground coffee and a tubular stem extending downwardly from the basket to the bottom of the pot. This stem serves the dual function of a support for locating the filter basket in an elevated position above the highest normal water level in the pot and a conduit through which hot water percolates upwardly from the bottom of the pot into the filter basket when the water is heated.

In use, the pot of the percolator is filled with water to a predetermined level, depending upon the number of cups of coffee to be brewed, and a corresponding quantity of ground coffee is placed in the filter basket of the removable percolating unit. This unit is then replaced in the percolator pot and the water in the pot is then heated to the proper percolating temperature. Hot water is thereby caused to percolate upwardly through the stem of the percolating unit into the filter basket. The water seeps downwardly through the coffee grounds and finally drains as hot coffee or coffee liquor back into the main body of liquid within the pot. After completion of the brewing or percolating cycle, the heat is removed or reduced to terminate the percolating action.

The existing coffee percolators are subject to the inherent disadvantage that removal of the percolating unit from the pot of the percolator at the completion of the percolating cycle is difficult, owing to the elevated temperature of the unit which is sufficiently high to cause a painful burn if grasped with a bare hand. Also, the unit is messy to handle. As a consequence, the percolating unit is commonly left in the pot. This is undesirable for several reasons. For example, coffee liquor continues to drip from the filter basket into the brewed coffee within the pot, thus undesirably increasing the strength of the coffee and eventually rendering the coffee bitter. The same undesirable result occurs, generally to a greater degree, if the percolator is left on a low heat to keep the coffee hot. In this case, a slight percolating action generally occurs which increases the strength and bitterness of the coffee. Occasionally, a person, after brewing coffee in a percolator, may forget that the percolating cycle has been completed and inadvertently re-heat the percolator to its percolating temperature. This, of course, renders the coffee totally undrinkable.

It is an object of this invention to provide an improved coffee percolator including an extractor for removing the percolating unit from the percolator pot at the conclusion of the percolating cycle, thereby to avoid the above-noted and other disadvantages of the existing percolators.

Another object of the invention is to provide a percolator af the character described wherein the extractor, when not in use, may be removed and stored in a conveniently accessible position within the percolator handle.

Other objects, features and advantages of the present invention will become apparent to those versed in the art from a consideration of the following description, the appended claims and the accompanying drawings, wherein:

FIGURE 1 is a side elevation of a coffee percolator according to the invention illustrating the extractor in its position of engagement with the removable percolating unit;

FIGURE 2 is an enlarged fragmentary section illustrating certain coacting gripping means for releasably securing the extractor to the percolating unit;

FIGURE 3 is an enlarged section taken on line 3—3 in FIGURE 2;

FIGURE 4 is an enlarged fragmentary section illustrating modified gripping means for releasably securing the extractor to the removable percolating unit;

FIGURE 5 is a section taken on line 5—5 in FIGURE 4;

FIGURE 6 is an enlarged fragmentary section illustrating further modified gripping means for releasably securing the extractor to the removable percolating unit; and FIGURE 7 is an enlarged fragmentary detail illustrating further modified gripping means for releasably securing the extractor to the removable percolating unit.

The improved coffee percolator 10 of the invention which has been selected for illustration in FIGURES 1 through 3 of these drawings comprise a pot 12, a percolating unit 14 removably positioned in the pot, and an extractor 16 for removing the unit from the pot. The percolator pot 12 and percolating unit 14 are conventional except for certain minor modifications which are necessary to accommodate the extractor 16. Accordingly, the percolator pot and percolating unit need be described only in sufficient detail to point out the differences between these parts and those of a conventional percolator.

With this in mind, the pot 12 of the illustrated percolator has a normally upright, generally cylindrical body 18 with a top opening 20 which is normally closed by a removable cover or lid (not shown). At the lower end of the pot body is an electrical heater which may be automatically controlled in response to the liquid temperature within the pot. Extending from one side of the body is a pouring spout 24. A handle 26 is attached to the opposite side of the body. The percolating unit 14 has an upper perforate filter basket 28 open at its top. Coaxially secured to the bottom wall of and extending downwardly from this filter basket to the bottom of the pot body 18 is a tubular stem 30. The upper end of this stem is open and terminates substantially flush with the top of the filter basket. The lower end (not shown) of the stem is open and is releasably engaged with the bottom of the pot 12 in the well known way, such that the stem serves the dual function of a support and a percolating conduit. With regard to its supporting function, the stem supports the filter basket 28 in its illustrated elevated position within the pot 12 wherein the basket is located just below the top opening 20 of the pot and above the highest normal water level in the pot. With regard to its percolating function, the stem serves as a conductor or conduit through which the water in the pot percolates upwardly from the bottom of the pot into the filter basket when the water is heated to the proper percolating temperature.

When the percolator is used to brew coffee, the percolating unit 14 is removed from the pot 12 and the latter is filled with water to the proper level, depending upon the number of cups of coffee to be brewed. A corresponding quantity of ground coffee 32 is placed in the filter basket 28 and the filter unit is replaced in the pot. The top opening 20 of the pot is then closed with a cover or lid (not shown) and the pot is heated to heat the water therein to the proper percolating temperature. This causes hot water to percolate upwardly through the stem 30 in such a way that the hot water discharges from the upper end of the stem over the ground coffee 32 within the filter basket 28. The water then seeps downwardly through the coffee grounds and finally drains as hot coffee or coffee liquor back into the body of hot water or coffee below the filter basket. After completion of the brewing or percolating cycle, the heat is removed or reduced sufficiently to terminate the percolating action.

As noted earlier, it is desirable to remove the percolating unit 14, along with its contained coffee grounds 32, from the pot 12 at the conclusion of the percolating cycle. According to the present invention, this removal is accomplished with the aid of the extractor 16. Extractor 16 has a shank 34 mounting at its upper end a handle or knob 36. The lower end of the shank and the upper end of the percolating stem 30 are equipped with coating releaseable gripping means 38 which permit the extractor to be released from the percolating unit when brewing coffee and thereafter secured to the unit for removing the latter from the pot 12 at the conclusion of the percolating cycle. In the form of the invention illustrated in FIGURES 1 through 3, the lower end of the extractor shank 34 is dimensioned for slidable insertion into the upper end of the percolating stem 30 and the gripping means 38 comprise a radial pin 40 on the lower end of the extractor shank which is engageable in a bayonet slot 42 extending axially into the upper end of the stem.

The extractor 16 is secured to the percolating unit 14 by inserting the extractor shank 34 into the stem 30 of the percolating unit and then rotating the extractor to is engaging position of FIGURES 2 and 3, wherein the extractor pin 40 is disposed in the closed leg of the bayonet 42. The extractor is released for separation from the percolating unit by rotating the extractor to a disengaging position, wherein its pin 40 is located in the open leg of the bayonet slot and then removing the extractor shank upwardly from the stem 30.

A feature of the invention resides in providing a chamber 44 in the pot handle 26 for receiving and storing the extractor 16 when the latter is not in use. The handle may be recessed at the outer end of this chamber to seat the extractor knob 36, and the latter may be shaped to match the shape of the handle, as shown, such that the extractor knob is substantially flush with the handle when the extractor is stored in the handle.

In FIGURES 4 and 5, the stem 30a of the percolating unit 14a and the shank 34a of the extractor 16a are equipped with modified coacting releasable gripping means 38a. Gripping means 38a comprise a pair of diametrically opposed external shoulders 40a on the lower end of the shank and a pair of diametrically opposed internal shoulders 42a within the upper end of the stem. The shoulders 40a may be formed by milling the lower end of the extractor shank 34a in the manner illustrated. The wall of the stem 30a may be crimped or otherwise deformed to define its internal shoulders 42a. The extractor 16a is secured to the percolating unit 14a by rotating the extractor to a disengaging position, wherein its shoulders 40a are axially aligned with the spaces between the stem shoulders 42a, inserting the extractor shank 34a into the upper end of the stem 30a to its position of FIGURE 4, and then rotating the extractor to its engaging position of the latter figure, wherein its shoulders are axially aligned with the undersides of the stem shoulders. The extractor is released from the percolating unit by reversing this procedure.

In FIGURE 6, the coating gripping means 38b on the percolating unit 14b and the extractor 16b comprise a hook 40b on the extractor shank 34b and a hole 42b in the upper end of the percolating stem 30b for receiving the hook. The parts are dimensioned to permit disengagement of the hook from the stem.

FIGURE 7 illustrates a percolating unit 14c having a stem 30c with an external circumferential groove 42c at its upper end and an extractor 16c having a shank 34c with tong means 40c at its lower end for gripping the stem at the groove. Tong means 40c comprise a fixed jaw 40c–1 rigid on the extractor shank, a movable jaw 40c–2 opposite the fixed jaw, and pin and slot cam means 40c–3 for camming the jaws into gripping engagement with the intervening stem 30c when the extractor 16c is pulled upwardly away from the stem and separating the jaws when the extractor is moved downwardly toward the stem. The tong jaws 40c–1, 40c–2 have projections 40c–4 on their gripping faces for engaging in the stem grooves 42c.

Those versed in the art will appreciate that the present invention achieves the objects and realizes the advantages hereinbefore mentioned.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:
1. In combination:
a coffee percolator comprising a pot and a removable percolating unit within said pot including a perforate filter basket within the upper end of said pot for containing ground coffee and a tubular percolating stem secured to said basket and extending downwardly to the bottom of said pot for vertically supporting said basket in an elevated position within said pot and including upward percolation of hot water from the bottom of said pot into said basket when water is heated in said pot,
an extractor for removing said percolating unit from said pot including a shank having normally upper and lower ends and a handle fixed to the upper end of said shank,
coacting gripping means on the upper end of said stem and the lower end of said shank for releasably securing said shank to said stem, thereby to permit attachment of said extractor to said percolating unit for removal of the latter from said pot, and
said pot including a handle having a chamber for receiving said extractor when not in use.

2. In combination:
a coffee percolator comprising a pot and a removable percolating unit within said pot including a perforate filter basket within the upper end of said pot for containing ground coffee and a tubular percolating stem secured to said basket and extending downwardly to the bottom of said pot for vertically supporting said basket in an elevated position within said pot and inducing upward percolation of hot water from the bottom of said pot into said basket when water is heated in said pot,
an extractor for removing said percolating unit from said pot including a shank having normally upper and lower ends and a handle fixed to the upper end of said shank,
the upper end of said stem being open and dimensioned to axially receive the lower end of said shank, and
coacting gripping means on the upper end of said stem and the lower end of said shank for releasably securing said shank to said stem, thereby to permit attachment of said extractor to said percolating unit for removal of the latter from said pot,
said coacting gripping means being engageable by relatively rotating said extractor and stem to an engaging position and disengageable by relatively rotating said extractor and stem to a disengaging position angularly displaced from said engaging position.

3. The combination according to claim 2 wherein:
said coacting gripping means comprise a bayonet slot extending axially into the upper end of said stem and a radially projecting pin on the lower end of said extractor shank engageable in said slot.

4. In combination:
a coffee percolator comprising a pot and a removable percolating unit within said pot including a perforate filter basket within the upper end of said pot for containing ground coffee and a tubular percolating stem secured to said basket and extending downwardly to the bottom of said pot for vertically supporting said basket in an elevated position within said pot and including upward percolation of hot water from the bottom of said pot into said basket when water is heated in said pot.

an extractor for removing said percolating unit from said pot including a shank having normally upper and lower ends and a handle fixed to the upper end of said shank, the upper end of said stem being open and dimensioned to axially receive the lower end of said shank, coacting gripping means on the upper end of said stem and the lower end of said shank for releasably securing said shank to said stem, thereby to permit attachment of said extractor to said percolating unit for removal of the latter from said pot, said coacting gripping means comprising a pair of diametrically opposed internal shoulders within the upper end of said stem and a pair of diametrically opposed external shoulders on the lower end of said extractor shank, said stem and extractor shoulders being engageable to secure said extractor to said stem by coaxially aligning said shank and stem, relatively rotating said extractor and stem to disengaging positions wherein said extractor shoulders are axially aligned with the spaces between said stem shoulders, axially inserting said shank into the upper end of said stem to a position wherein said extractor shoulders are disposed below said stem shoulders, and relatively rotating said extractor and stem to engaging positions wherein said extractor shoulders are axially aligned with and engage under said stem shoulders, and said stem and extractor being released for axial separation by relative rotation from said engaging to said disengaging positions.

5. In combination:
a coffee percolator comprising a pot and a removable percolating unit within said pot including a perforate filter basket within the upper end of said pot for containing ground coffee and a tubular percolating stem secured to said basket and extending downwardly to the bottom of said pot for vertically supporting said basket in an elevated position within said pot and inducing upward percolation of hot water from the bottom of said pot into said basket when water is heated in said pot, an extractor for removing said percolating unit from said pot including a shank having normally upper and lower ends and a handle fixed to the upper end of said shank, the upper end of said stem being open and dimensioned to axially internally receive the lower end of said extractor shank, and coacting gripping means on the upper end of said stem and the lower end of said shank for releasably securing said shank to said stem, thereby to permit attachment of said extractor to said percolating unit for removal of the latter from said pot, said coacting gripping means comprising a hook on the lower end of said shank having a single prong and a hole in the upper end of said stem through which said prong may be inserted from the inside of said stem by insertion of the lower end of said extractor shank into said stem.

References Cited
UNITED STATES PATENTS 2,809,578 10/1957 Campbell _____ 99—312
3,282,196 11/1966 Manship et al. _____ 99—310

FOREIGN PATENTS 249,531 7/1926 Italy.

WILLIAM I. PRICE, *Primary Examiner.*